(12) United States Patent
Baro et al.

(10) Patent No.: US 10,442,891 B2
(45) Date of Patent: Oct. 15, 2019

(54) METHOD OF FORMING AND USING A BISPHENOL OIL STREAM

(71) Applicant: Sabic Global Technologies B.V., Bergen op Zoom (NL)

(72) Inventors: Karl Aaron Baro, Evansville, IN (US); Pankaj Singh Gautam, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 57 days.

(21) Appl. No.: 15/951,373

(22) Filed: Apr. 12, 2018

(65) Prior Publication Data

US 2018/0319932 A1    Nov. 8, 2018

(30) Foreign Application Priority Data

May 4, 2017    (EP) .................... 17169472

(51) Int. Cl.

| | |
|---|---|
| *C08G 64/04* | (2006.01) |
| *C08G 64/24* | (2006.01) |
| *C08G 64/20* | (2006.01) |
| *B01J 8/00* | (2006.01) |
| *C08L 69/00* | (2006.01) |
| *C08G 64/30* | (2006.01) |

(52) U.S. Cl.
CPC ............ *C08G 64/24* (2013.01); *B01J 8/0015* (2013.01); *C08G 64/04* (2013.01); *C08G 64/205* (2013.01); *C08G 64/307* (2013.01); *C08L 69/00* (2013.01); *B01J 2219/0004* (2013.01); *B01J 2219/00042* (2013.01)

(58) Field of Classification Search
USPC ........................................................ 528/196
See application file for complete search history.

(56) References Cited

U.S. PATENT DOCUMENTS

| | | | |
|---|---|---|---|
| 4,810,813 | A | 3/1989 | Kosky et al. |
| 4,861,919 | A | 8/1989 | Robbins et al. |
| 5,225,518 | A | 7/1993 | Kissinger |
| 5,412,060 | A | 5/1995 | Wulff et al. |
| 5,512,700 | A | 4/1996 | Patrascu et al. |
| 6,197,917 | B1 | 3/2001 | Kimura et al. |
| 6,476,179 | B1 | 11/2002 | Ito et al. |
| 6,683,223 | B2 | 1/2004 | Bodiger et al. |

FOREIGN PATENT DOCUMENTS

| | | |
|---|---|---|
| JP | 2000178354 A | 6/2000 |
| WO | 03010219 A1 | 2/2003 |
| WO | 2013027165 A1 | 2/2013 |
| WO | 2013175448 A1 | 11/2013 |
| WO | 2014072923 A1 | 5/2014 |

*Primary Examiner* — Terressa Boykin
(74) *Attorney, Agent, or Firm* — Cantor Colburn LLP

(57) ABSTRACT

In an embodiment, a continuous method of forming a bisphenol A oil comprises forming the bisphenol A oil by mixing a molten bisphenol A and water; wherein the bisphenol A oil comprises 10 to 30 wt % water based on a total weight of the bisphenol A oil and is at a temperature of 100 to 140° C.; flowing at least a portion of the bisphenol A oil through an inline densitometer and measuring a real-time density and a real-time temperature of the bisphenol A oil; determining a real-time concentration of the bisphenol A oil based on said real-time density and said real-time temperature.

18 Claims, 3 Drawing Sheets

METHOD OF FORMING AND USING A BISPHENOL OIL STREAM

CROSS-REFERENCE TO RELATED APPLICATION

This application claims the benefit of European Application Serial No. 17169472 filed May 4, 2017. The related application is incorporated herein in its entirety by reference.

BACKGROUND

Interfacial polycarbonate plants currently use a complex system of flakers or prilling units, silos, transfer blowers, and diverter valves to deliver flaked bisphenol A to the reactor. For example, FIG. 1 illustrates post treatment process 10 currently used after the formation of bisphenol A involving the formation of a solid bisphenol A in a flaking unit. FIG. 1 illustrates that crystallized stream 32 is directed to phenol stripping unit 12 to form molten stream 42. Molten stream 42 is then solidified in a flaking unit 14. In flaking unit 14, the molten stream 42 is cooled below the freezing point of bisphenol A and the solidified bisphenol A is then scraped from the flaker drum to form flakes, which then drop into a receiver and are conveyed via flake stream 44 to transfer silos 16 by a blower. From transfer silos 16 the bisphenol A flakes are transferred to storage silos 18, again by a blower. When the bisphenol A is to be used in the polymerization of polycarbonate, the bisphenol A flakes are then transferred from storage silos 18 to polycarbonate production plant 20. In polycarbonate production plant 20, the bisphenol A flakes are weighed in weigh hopper 22 and then the desired amount is added to the reaction vessel.

When producing the bisphenol A flakes or when otherwise handling bisphenol A flakes, a fine bisphenol dust is produced, which consists of high purity bisphenol A. The dust is tacky and difficult to handle and it can be difficult to determine a precise amount of bisphenol A being added to the reaction vessel. Furthermore, handling this dust involves the risk of dust explosions. For this reason, the bisphenol dust is usually disposed of and, for example, incinerated, which entails a costly manual handling procedure and extensive safety precautions due to the risk of dust explosions. The disposal process has the disadvantages that at least a portion of the valuable raw material is being destroying and it has high handling costs. Further still, in order to reduce the risk of explosions in the facility, the bisphenol A flakes need to be stored in a nitrogen environment, requiring the use of nitrogen blanketing in the flaking unit, the transfer silos, and the storage silos and oxygen monitors need to be located at various points in the system to ensure a low oxygen content.

An improved method of transferring bisphenol A stream is therefore desired.

BRIEF SUMMARY

Disclosed herein is a method of forming a bisphenol oil stream.

In an embodiment, a continuous method of forming a bisphenol A oil comprises forming the bisphenol A oil by mixing a molten bisphenol A and water; wherein the bisphenol A oil comprises 10 to 30 wt % water based on a total weight of the bisphenol A oil and is at a temperature of 100 to 140° C.; flowing at least a portion of the bisphenol A oil through an inline densitometer and measuring a real-time density and a real-time temperature of the bisphenol A oil; determining a real-time concentration of the bisphenol A oil based on said real-time density and said real-time temperature.

In another embodiment, a method for interfacially polymerizing a polycarbonate, comprises adding a bisphenol A oil, a carbonate compound, water, a water immiscible solvent, and a catalyst to an interfacial reactor, wherein the bisphenol A oil comprises bisphenol A and 10 to 30 wt % water based on a total weight of the bisphenol A oil and is at a temperature of 100 to 140° C.; and interfacially polymerizing the polycarbonate. During the adding of the bisphenol A oil, the method comprises flowing at least a portion of the bisphenol A oil through an inline densitometer; measuring a real-time density and a real-time temperature of the bisphenol A oil; and determining a real-time concentration of the bisphenol A oil based on said real-time density and said real-time temperature.

The above described and other features are exemplified by the following figures, detailed description, and claims.

BRIEF DESCRIPTION OF THE DRAWINGS

Refer now to the figures, which are exemplary embodiments, and wherein the like elements are numbered alike.

DETAILED DESCRIPTION

Figure 1:
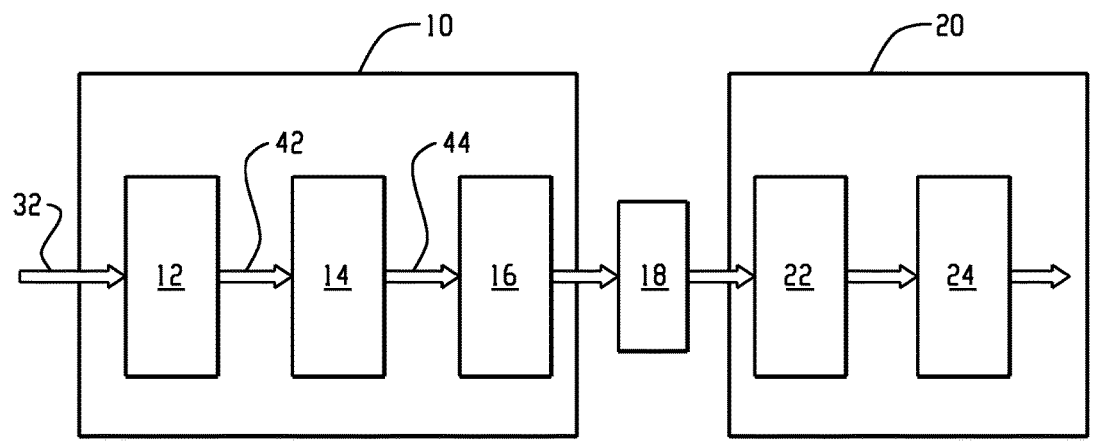
FIG. 1 is an illustration of an embodiment of integrated bisphenol A and polycarbonate production facilities transferring bisphenol A flakes.

Due to the inherent issues that arise during the storage and transfer of bisphenol A, a transfer method using a bisphenol A oil was developed. Relatively pure bisphenol A at room temperature is a solid that can form crystals or flakes having a melting point of about 150 to 155 degrees Celsius (° C.) and the solid is practically insoluble in water. However, in the presence of an equimolar proportion of water of 7.3 weight percent (wt %) the melting point of bisphenol A can be lowered to 96° C. Above this temperature, the bisphenol A-water mixture can form a single phase bisphenol A oil. A process of forming and transferring a bisphenol A oil with excellent control using a densitometer to determine a real-time concentration was developed that allows for the bisphenol A to be maintained in liquid form and the concentration to be constantly monitored.

The present method can comprise flowing the bisphenol A oil (also referred to herein as the bisphenol oil) through an inline densitometer and determining the real-time concentration of the bisphenol A oil. The bisphenol A oil can be formed in a bisphenol A production plant and can be used in a polycarbonate production plant. The real-time concentration of the bisphenol A oil can be determined and monitored during formation of the bisphenol A oil during a post-treatment process in a bisphenol A production plant. The real-time concentration of the bisphenol A oil can be determined and monitored during addition of the bisphenol A oil to a reaction vessel in a polycarbonate production plant. The ability to determine the real-time concentration can allow for a more precise determination of the amount of bisphenol A being transferred and can allow for a responsive adjustment of the amount of bisphenol A being transferred. Ultimately, when this process is used in combination with polycarbonate polymerization, it can allow for the production of a more consistent polycarbonate product.

The method can also comprise a feedback loop such that if the real-time concentration is not within a desired range, then a flow rate of at least one of the bisphenol A and the water can be automatically adjusted. For example, if the real-time concentration is not within 5%, or within 1% of a desired value, then a flow rate can be increased or decreased as needed. Using this method, the real-time concentration can be maintained within 5%, or within 1% of an average value.

The bisphenol A can be prepared in a bisphenol production plant by reacting a feed stream comprising phenol, acetone, and optionally, a promoter in a bisphenol reactor. The bisphenol reactor can be a fixed bed reactor comprising a catalyst. The catalyst can comprise an ion exchange resin (such as a tert-amine divinylbenzene/styrene ion exchange copolymer). The catalyst can be used in a guard bed to neutralize any acidic species leaching from the sulfonated divinylbenzene/styrene copolymer. The catalyst can comprise a strong acid catalyst (such as hydrochloric acid), a sulfonic resin, and a sulfur containing promoter (such as a mercaptan promoter (such as methyl mercaptan, ethyl mercaptan, mercaptocarboxylic acid, 2,2-bis(methylthio)propane, or 3-mercaptopropionic acid)), or a combination comprising at least one of the foregoing. The bisphenol reactor feed stream can comprise 75 to 95 wt % phenol and 3 to 7 wt % acetone.

The resultant bisphenol A stream prepared in the bisphenol reactor comprises a product mixture from the bisphenol A reaction. The product mixture can comprise 15 to 40 wt %, or 20 to 35 wt % of bisphenol A based on a total weight of the product mixture. The product mixture can comprise 60 to 85 wt %, or 55 to 70 wt % of phenol based on a total weight of the product mixture. The product mixture can comprise 5 to 15 wt % of byproduct based on a total weight of the product mixture. The product mixture can comprise 0 to 5 wt %, or 0 to 3.5 wt % of water based on a total weight of the product mixture. The product mixture can comprise 0 to 2.5 wt %, or 0 to 1.5 wt % of acetone based on a total weight of the product mixture.

The resultant bisphenol A stream comprising the product mixture can be directed to a crystallization unit to form bisphenol A crystals comprising, for example, one or both of crystalline bisphenol A and an adduct of bisphenol A and phenol. It is noted that "adduct" as used herein refers to the physical association of bisphenol A and phenol (e.g., one mole of bisphenol A and one mole of phenol can crystallize together to form a 1:1 molar ratio of bisphenol A/phenol adduct). The directing of the product mixture can comprise directing 300 to 1,000 tons of bisphenol A per day to the crystallization unit. The crystals can be separated by removing the solid portion from the crystallization unit comprising the crystals, for example, via filtration, to form a crystallized stream.

Figure 2:
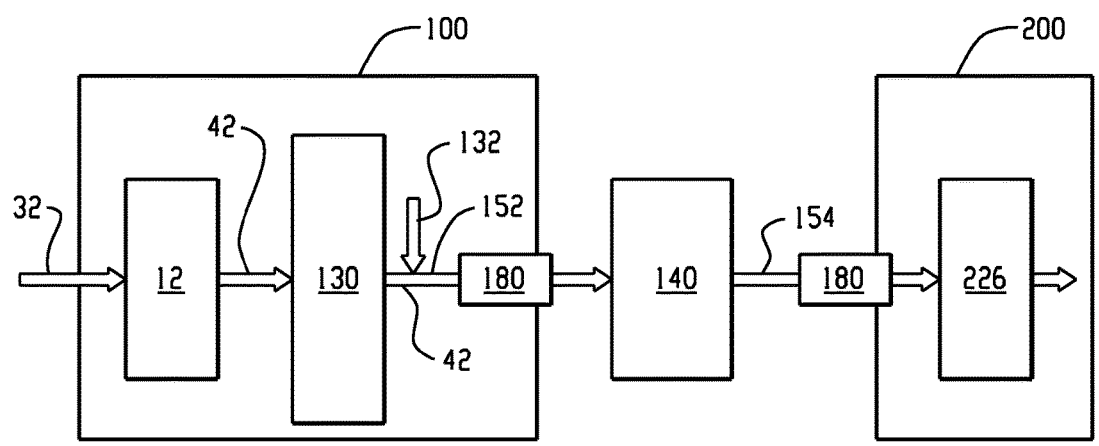
FIG. 2 is an illustration of an embodiment of integrated bisphenol A and polycarbonate production facilities transferring a bisphenol A oil.

FIG. 2 illustrates that crystallized stream 32 can be directed to phenol stripping unit 12. Phenol stripping unit 12 can melt the bisphenol A crystals, for example, by heating the crystals at a temperature of greater than the crystallization temperature and then strip the phenol from the molten phenol/bisphenol A adduct, producing molten stream 42.

Molten stream 42 can comprise greater than or equal to 99.5 wt %, or 99.5 to 99.95 wt % bisphenol A, and less than or equal to 150 parts per million by weight (ppm) phenol; based on a total weight of the molten stream.

Molten stream 42 can be directed to molten bisphenol vessel 130. While FIG. 2 illustrates that molten stream 42 is directed to molten bisphenol vessel 130, molten stream 42 can be directed to one or more of molten bisphenol vessel 130, oil storage vessel 140, and to polycarbonate production plant 200. Water stream 132 can be added to molten stream 42 and the water and molten bisphenol A can be mixed in an inline mixer to form bisphenol oil stream 152. Conversely, the water stream can be added to a mixing vessel comprising molten bisphenol A to form the bisphenol oil. The water can be added at a temperature of 55 to 99° C., or 55 to 75° C., or 80 to 99° C. to a molten bisphenol A at a temperature of 160 to 220° C. The water can be purified water obtained via at least one of deionization, reverse osmosis, or distillation. The resultant bisphenol oil comprises 10 to 30 wt % of water based on the total weight of the bisphenol oil. The bisphenol oil can comprise 70 to 90 wt % of bisphenol A based on the total weight of the bisphenol oil. The bisphenol oil can be maintained at a temperature of 100 to 140° C. If the bisphenol oil comprises greater than the 30 wt % of water or if the temperature is below 100° C., then a two phase system can be formed and the mixture is no longer a bisphenol oil.

Inline densitometer 180 can measure the real-time concentration of bisphenol oil stream 152. If the real-time concentration is not within a desired range, for example, if the real-time concentration is not within 5%, or within 1% of a desired value, then a flow rate of at least one of the bisphenol A and the water can be adjusted. The real-time concentration can be maintained within 1% of an average value.

While FIG. 2 illustrates that bisphenol oil stream 152 is directed to oil storage vessel 140, bisphenol oil stream 152 can be directed to one or both of oil storage vessel 140 and polycarbonate production plant 200. Oil storage vessel 140 can maintain the bisphenol oil at a temperature of 100 to 140° C. The oil storage vessel 140 can maintain the bisphenol oil at a pressure of greater than or equal to 100 kilopascals (kPa), or 100 to 500 kPa. The bisphenol oil can be stored in oil storage vessel 140 without mixing and still maintain a single oil phase. The bisphenol oil can be stored in oil storage vessel 140 for less than or equal to 40 hours, or less than or equal to 25 hours, or less than or equal to 5 hours.

Stored oil stream 154 can be directed from oil storage vessel 140 to reactor 226 in polycarbonate production plant 200. As the concentration of stored oil stream 154 can be different from bisphenol oil stream 152, for example, due to water evaporation, a second inline densitometer can be present to determine the real-time concentration of stored oil stream 154 prior to adding to the polycarbonate production plant 200. Alternatively, or in addition to stored oil stream 154, the bisphenol oil stream that is directed to the polycarbonate production plant 200 can originate from a melting vessel that melts a solid bisphenol A, where the oil is formed either in the melting vessel or via an inline mixer located upstream of densitometer 180.

The bisphenol A production plant and the polycarbonate production plant can be housed in the same geographical location or they can be at separate locations. If they are housed in the same geographical location, all or a portion of bisphenol oil stream 152 can be directed directly to the polycarbonate production plant, for example, without an intermediary storage step. If they are housed in different geographical locations, the oil storage vessel can be shipped from the bisphenol A production plant to the polycarbonate production plant.

Figure 3:
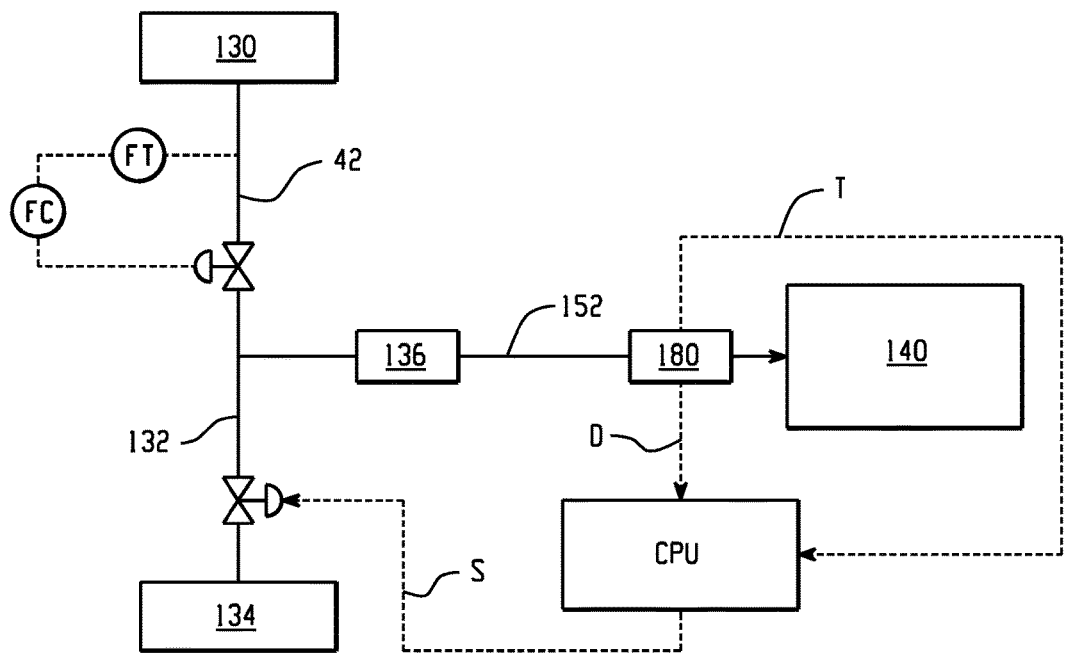
FIG. 3 is an illustration of an embodiment of an inline densitometer located downstream of a bisphenol A production plant.

FIG. 3 is an illustration of an inline densitometer located downstream of a bisphenol A production plant. FIG. 3 shows that molten stream 42 from molten bisphenol vessel 130 can be mixed with water stream 132 from water vessel 134 in inline mixer 136. The flow rate of molten stream 42 can be controlled by flow transmitter FT that transmits a signal to flow controller FC that sets the valve position. Bisphenol oil stream 152 can be directed to densitometer 180 that measures the real-time density D and the real-time temperature T of the stream as it passes through the densitometer. The real-time density D and the real-time temperature T data is transmitted to a computer CPU that determines the real-time concentration from an experimentally derived regression equation using the real-time density D and the real-time temperature T. Based on the real-time concentration, the computer CPU can send a signal S to a valve to increase or decrease the flow rate of water stream 132. Alternatively, or in addition to, the CPU can send a signal to a valve controlling the flow rate of molten stream 42. After the concentration of bisphenol oil stream 152 is determined, it can be directed to oil storage vessel 140.

Figure 4:
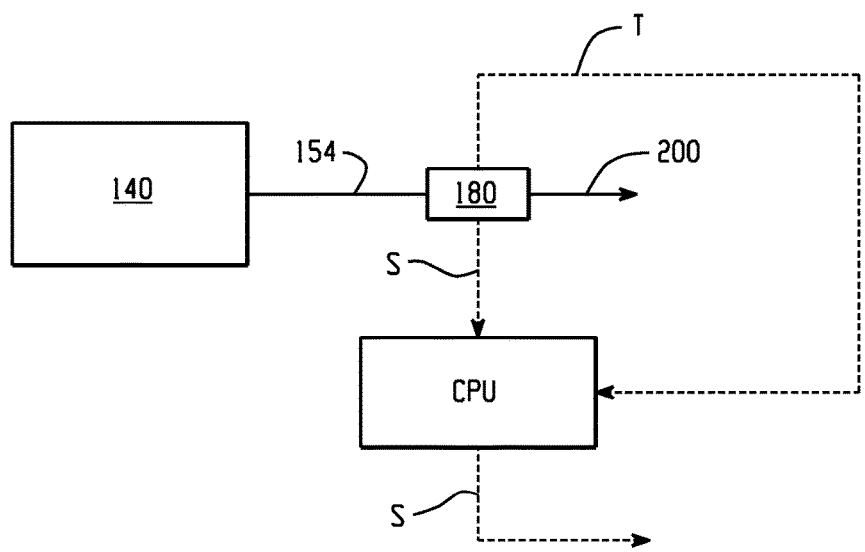
FIG. 4 is an illustration of an embodiment of an inline densitometer located upstream of a polycarbonate production plant.

FIG. 4 is an illustration of an inline densitometer located upstream of a polycarbonate production plant. FIG. 4 shows that stored oil stream 154 can be directed from oil storage vessel 140 to densitometer 180 that measures the real-time density D and the real-time temperature T of the stream as it passes through the densitometer. The real-time density D and the real-time temperature T data is transmitted to a computer CPU that determines the real-time concentration from an experimentally derived regression equation using the real-time density D and the real-time temperature T. Based on the real-time concentration, the computer CPU can send a signal S to a valve to increase or decrease one or more of the flow rate of stored stream 154, an additional water stream, a carbonate stream, and a catalyst stream that are being directed to a reactor in the polycarbonate production plant. Alternatively, or in addition to, the CPU can send a signal to a valve controlling a supplemental water stream located upstream of densitometer 180. It is noted that while FIG. 4 illustrates that stored stream 154 originates from oil storage vessel 140, the stream could originate from a melting vessel that melts a solid bisphenol A, where the oil is formed either in the melting vessel or via an inline mixer located upstream of densitometer 180.

The bisphenol oil can be used in the polymerization of polycarbonate in a polycarbonate production plant. The polymerization can comprise interfacially polymerizing the polycarbonate, which is known, and is described, for example, in WO 2013/175448 A1 and WO 2014/072923 A1. Using the present method of transferring the bisphenol A oil, the precise amount of bisphenol A added into the reactor can be determined and monitored with time.

The polymerizing can comprise interfacially polymerizing the polycarbonate. Advantageously, the amount of water in the bisphenol oil constitutes 17 to 45 wt % of the total water conventionally present in the interfacial polymerization. Accordingly, the water contributed bisphenol oil can be accounted for as a part of the total water normally present in the reaction. Although the reaction conditions for interfacial polymerization can vary, the process can involve adding additional water to the bisphenol oil, adding the resulting mixture to a water-immiscible solvent (such as methylene chloride, 1,2-dichloroethane, chlorobenzene, toluene, or the like), adding a carbonate compound, and adding an interfacial catalyst. The carbonate compound can comprise a carbonyl halide such as carbonyl bromide or carbonyl chloride (phosgene), a bishaloformate of a dihydroxy compound (e.g., the bischloroformate of bisphenol A, hydroquinone ethylene glycol, neopentyl glycol, or the like), a diaryl carbonate, an activated diaryl carbonate, or a combination comprising at least one of the foregoing. The interfacial catalyst can comprise a tertiary amine or a phase transfer catalyst. The interfacial catalyst can comprise in aqueous NaOH, KOH, or a combination comprising at least one of the foregoing. The interfacial polymerizing can occur under controlled pH conditions, e.g., 8 to 10.

The following examples are provided to illustrate the present disclosure. The examples are merely illustrative and are not intended to limit devices made in accordance with the disclosure to the materials, conditions, or process parameters set forth therein.

EXAMPLES

Example 1: Density Determination of Bisphenol A Oil Versus Water

Figure 5:
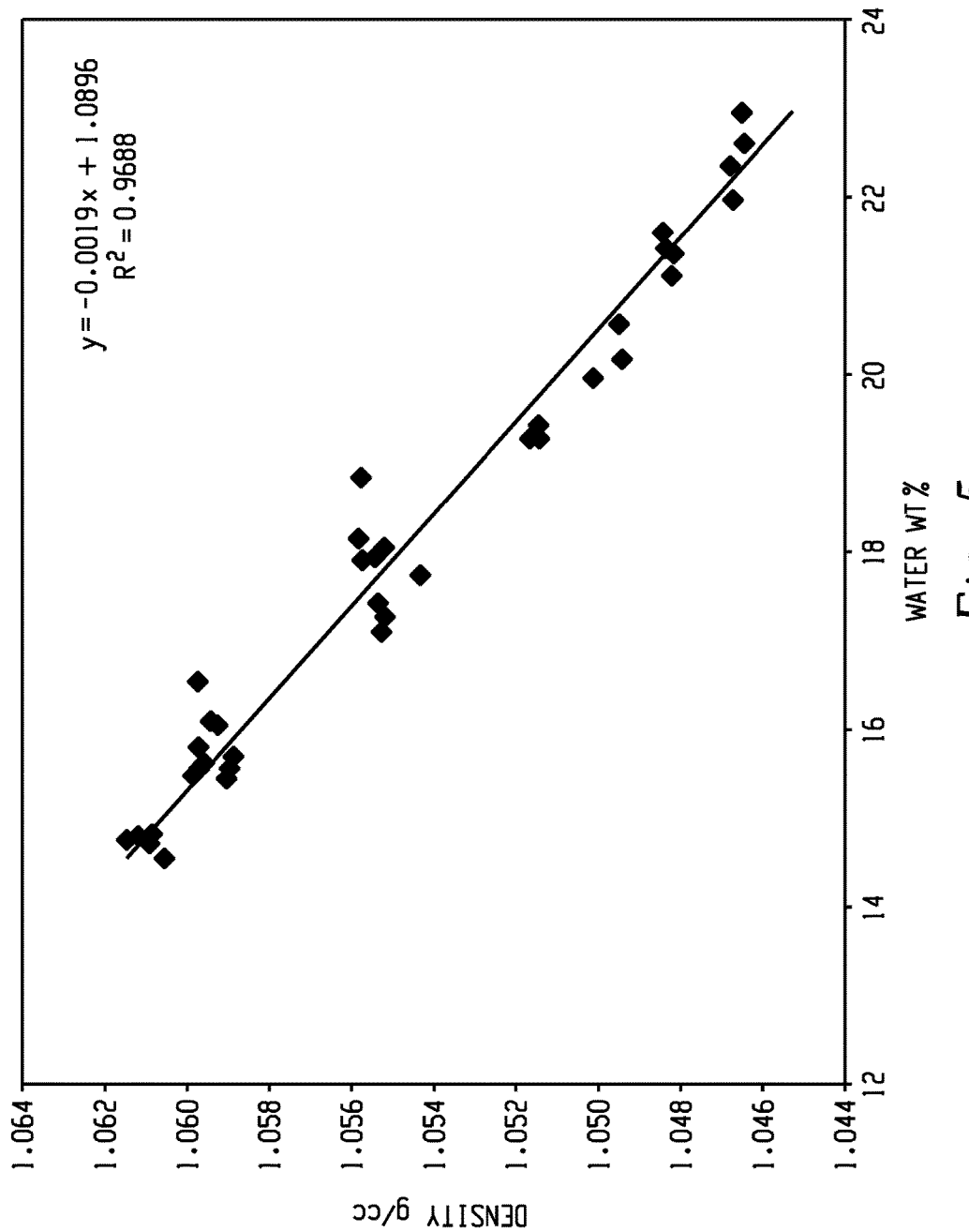
FIG. 5 is a graphical illustration of the density change of bisphenol A oil with water content of Example 1.

Several bisphenol A oils were prepared with varying water content ranging from 14 to 32 wt % based on the total weight of the bisphenol A oil. The bisphenol A oils were prepared by heating bisphenol A having a purity of 99.5 wt % bisphenol A based on the total weight of the bisphenol A, to a temperature of 187° C. Water at a temperature of 61° C. was added to the bisphenol A with mixing. The density of the oils was determined at temperatures of 113 to 133° C. The density of the bisphenol A oil in cubic centimeters (cc) was then plotted versus the weight percent water, the density at 123° C. is illustrated in FIG. 5. A linear fit across the temperature range studied shows that the density=(−0.00201 times the weight percent of water)−(0.00044 times the temperature)+1.2035.

Set forth below are various non-limiting aspects of the present disclosure.

Aspect 1: A continuous method of forming a bisphenol A oil comprising: forming the bisphenol A oil by mixing a molten bisphenol A and water; wherein the bisphenol A oil comprises 10 to 30 wt % water based on a total weight of the bisphenol A oil and is at a temperature of 100 to 140° C.; flowing at least a portion of the bisphenol A oil through an inline densitometer and measuring a real-time density and a real-time temperature of the bisphenol A oil; determining a real-time concentration of the bisphenol A oil based on said real-time density and said real-time temperature.

Aspect 2: The method of Aspect 1, wherein the determining the real-time concentration of the bisphenol A oil comprises using an experimentally derived calibration curve or an regression equation.

Aspect 3: The method of any one or more of the foregoing aspects, wherein if the real-time concentration is not within a desired range, then the method comprises adjusting a flow rate of at least one of the molten bisphenol A and the water during the forming until the real-time concentration is within the desired range.

Aspect 4: The method of any one or more of the foregoing aspects, further comprising adding the bisphenol A oil to a polycarbonate polymerization reactor, preferably, an interfacial polycarbonate polymerization reactor.

Aspect 5: The method of Aspect 4, comprising storing the bisphenol A oil prior to adding to the polycarbonate polymerization reactor; and determining a second real-time concentration of the bisphenol A oil during the adding to the polycarbonate polymerization reactor.

Aspect 6: The method of Aspect 5, further comprising continuously adjusting an oil stream flowrate of the bisphenol A oil during the adding to the polycarbonate polymerization reactor based on the second real-time concentration.

Aspect 7: The method of Aspect 5 or 6, wherein the storing comprises storing for less than or equal to 40 hours.

Aspect 8: The method of Aspect 7, wherein the storing comprises storing for less than or equal to 25 hours.

Aspect 9: The method of Aspect 8, wherein the storing comprises storing for less than or equal to 5 hours, or 0.1 to 5 hours.

Aspect 10: The method of any one or more of the preceding aspects, further comprising transmitting the real-time density and the real-time temperature to a computer that determines the real-time concentration from an experimentally derived regression equation.

Aspect 11: The method of Aspect 10, wherein, based on the real-time concentration, the computer sends a signal to a valve to increase or decrease a flow rate of one or more of the molten bisphenol A, the water, and, optionally, if the bisphenol A oil is being added to the polycarbonate polymerization reactor, then one or more of an additional water stream, a carbonate stream, and a catalyst stream that are being directed to polycarbonate polymerization reactor.

Aspect 12: The method of any one or more of the foregoing aspects, further comprising forming the molten bisphenol A prior to forming the bisphenol A oil. For example, the method can comprise, prior to the forming the bisphenol A oil, forming a bisphenol A adduct; separating phenol from the bisphenol A adduct in a phenol stripping unit (such as a desorber); and removing the molten bisphenol A from the phenol stripping unit.

Aspect 13: A method for interfacially polymerizing a polycarbonate, comprising: adding a bisphenol A oil, a carbonate compound, water, a water immiscible solvent, and a catalyst to an interfacial reactor, wherein the bisphenol A oil comprises bisphenol A and 10 to 30 wt % water based on a total weight of the bisphenol A oil and is at a temperature of 100 to 140° C.; and interfacially polymerizing the polycarbonate. The method comprising, during the adding of the bisphenol A oil, flowing at least a portion of the bisphenol A oil through an inline densitometer; measuring a real-time density and a real-time temperature of the bisphenol A oil; and determining a real-time concentration of the bisphenol A oil based on said real-time density and said real-time temperature. The bisphenol A oil can be formed by any one or more of the foregoing aspects.

Aspect 14: The method of Aspect 13, further comprising continuously adjusting one or both of an oil stream flowrate of the bisphenol A oil and a carbonate flow rate of the carbonate compound during the adding to the interfacial reactor based on the real-time concentration.

Aspect 15: The method of any one of the preceding aspects, wherein the forming the bisphenol A oil comprises, forming the bisphenol A oil by adding the water at a temperature of 55 to 99° C. to the molten bisphenol A at a temperature of 160 to 220° C.

Aspect 16: The method of any one of the preceding aspects, wherein the forming the bisphenol A oil comprises, forming the bisphenol A oil by adding the water at a temperature of 80 to 99° C. to the molten bisphenol A at a temperature of 160 to 220° C.

Aspect 17: The method of any one of the preceding aspects, wherein the molten bisphenol A comprises 99.5 to 99.95 wt % of bisphenol A.

Aspect 18: The method of any one of the preceding aspects, wherein the forming the bisphenol A oil comprises adding the water to a molten bisphenol A stream and mixing in an inline mixer.

Aspect 19: The method of any one or more of Aspects 1 to 17, wherein the forming the bisphenol A oil stream comprises adding the water to a mixing tank comprising the molten bisphenol A.

Aspect 20: The method of any one of the preceding aspects, further comprising maintaining the real-time concentration within 5% of an average value.

Aspect 21: The method of any one of the preceding aspects, further comprising maintaining the real-time concentration within 1% of an average value.

Aspect 22: The method of any one of the preceding aspects, comprising continuously measuring the flow rate of the bisphenol A oil.

Aspect 23: The method of any one of the preceding aspects, further comprising melting a solid bisphenol A to form the molten bisphenol A prior to forming the bisphenol A oil.

Aspect 24: Use of an inline densitometer (for example in accordance with any one or more of the preceding aspects) in determining a real-time concentration of a bisphenol A oil stream at a temperature of 90 to 140° C.; wherein the bisphenol A oil stream comprises bisphenol A and 10 to 30 wt % water based on a total weight of the bisphenol A oil stream.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the functions or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an embodiment", "another embodiment", "some embodiments", "an aspect", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

The endpoints of all ranges directed to the same component or property are inclusive of the endpoints, are independently combinable, and include all intermediate points and ranges. For example, ranges of "up to 25 wt %, or more specifically 5 to 20 wt %" is inclusive of the endpoints and all intermediate values of the ranges of "5 to 25 wt %," such as 10 to 23 wt %, etc.).

The term "combination" is inclusive of blends, mixtures, alloys, reaction products, and the like. Also, "combinations comprising at least one of the foregoing" means that the list is inclusive of each element individually, as well as combinations of two or more elements of the list, and combinations of at least one element of the list with like elements not named.

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to Applicants or others skilled in the art. Accordingly, the appended claims as filed and as they may be amended are intended to embrace all such alternatives, modifications variations, improvements, and substantial equivalents.

What is claimed is:

1. A continuous method of forming a bisphenol A oil comprising:
   forming the bisphenol A oil by mixing a molten bisphenol A and water; wherein the bisphenol A oil comprises 10 to 30 wt % water based on a total weight of the bisphenol A oil and is at a temperature of 100 to 140° C.;
   flowing at least a portion of the bisphenol A oil through an inline densitometer and measuring a real-time density and a real-time temperature of the bisphenol A oil;
   determining a real-time concentration of the bisphenol A oil based on the real-time density and the real-time temperature.

2. The method of claim 1, wherein the determining the real-time concentration of the bisphenol A oil comprises using an experimentally derived calibration curve.

3. The method of claim 1, wherein if the real-time concentration is not within a desired range, then the method comprises adjusting a flow rate of at least one of the molten bisphenol A and the water during the forming until the real-time concentration is within the desired range.

4. The method of claim 1, further comprising adding the bisphenol A oil to a polycarbonate polymerization reactor.

5. The method of claim 4, comprising storing the bisphenol A oil prior to adding to the polycarbonate polymerization reactor; and determining a second real-time concentration of the bisphenol A oil during the adding to the polycarbonate polymerization reactor.

6. The method of claim 5, further comprising continuously adjusting an oil stream flowrate of the bisphenol A oil during the adding to the polycarbonate polymerization reactor based on the second real-time concentration.

7. The method of claim 5 or 6, wherein the storing comprises storing for less than or equal to 40 hours, preferably, less than or equal to 25 hours, more preferably, less than or equal to 5 hours.

8. The method of claim 1, wherein the molten bisphenol A comprises 99.5 to 99.95 wt % of bisphenol A.

9. The method of claim 1, wherein the forming the bisphenol A oil comprises adding the water to a molten bisphenol A stream and mixing in an inline mixer; or wherein the forming the bisphenol A oil stream comprises adding the water to a mixing tank comprising the molten bisphenol A.

10. The method of claim 1, further comprising maintaining the real-time concentration within 1% of an average value.

11. The method of claim 1, comprising continuously measuring a flow rate of the bisphenol A oil.

12. A method for interfacially polymerizing a polycarbonate, comprising:
    adding a bisphenol A oil, a carbonate compound, water, a water immiscible solvent, and a catalyst to an interfacial reactor, wherein the bisphenol A oil comprises bisphenol A and 10 to 30 wt % water based on a total weight of the bisphenol A oil and is at a temperature of 100 to 140° C.; and
    during the adding of the bisphenol A oil,
       flowing at least a portion of the bisphenol A oil through an inline densitometer;
       measuring a real-time density and a real-time temperature of the bisphenol A oil; and
       determining a real-time concentration of the bisphenol A oil based on said real-time density and said real-time temperature; and
    interfacially polymerizing the polycarbonate.

13. The method of claim 12, further comprising continuously adjusting one or both of an oil stream flowrate of the bisphenol A oil and a carbonate flow rate of the carbonate compound during the adding to the interfacial reactor based on the real-time concentration.

14. The method of claim 12, wherein the forming the bisphenol A oil comprises, forming the bisphenol A oil by adding the water at a temperature of 55 to 99° C., or 80 to 99° C. to the molten bisphenol A at a temperature of 160 to 220° C.

15. The method of claim 12, wherein the molten bisphenol A comprises 99.5 to 99.95 wt % of bisphenol A.

16. The method of claim 12, wherein the forming the bisphenol A oil comprises adding the water to a molten bisphenol A stream and mixing in an inline mixer; or wherein the forming the bisphenol A oil stream comprises adding the water to a mixing tank comprising the molten bisphenol A.

17. The method of claim 12, further comprising maintaining the real-time concentration within 1% of an average value.

18. The method of claim 12, comprising continuously measuring a flow rate of the bisphenol A oil.

* * * * *